United States Patent
Arshad et al.

(10) Patent No.: US 10,708,944 B2
(45) Date of Patent: Jul. 7, 2020

(54) PRECONFIGURED GRANTS WITH A DISTRIBUTION PATTERN

(71) Applicant: Telefonaktiebolaget LM Ericsson (publ), Stockholm (SE)

(72) Inventors: Malik Wahaj Arshad, Sigtuna (SE); Qianxi Lu, Beijing (CN); Zhenhua Zou, Solna (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/769,218

(22) PCT Filed: Jan. 4, 2018

(86) PCT No.: PCT/SE2018/050004
§ 371 (c)(1),
(2) Date: Apr. 18, 2018

(87) PCT Pub. No.: WO2018/128578
PCT Pub. Date: Jul. 12, 2018

(65) Prior Publication Data
US 2019/0069319 A1    Feb. 28, 2019

Related U.S. Application Data

(60) Provisional application No. 62/443,358, filed on Jan. 6, 2017.

(51) Int. Cl.
*H04W 72/14* (2009.01)
*H04L 5/00* (2006.01)
*H04W 72/12* (2009.01)

(52) U.S. Cl.
CPC ........... *H04W 72/14* (2013.01); *H04L 5/0037* (2013.01); *H04L 5/0044* (2013.01);
(Continued)

(58) Field of Classification Search
CPC ..... H04W 16/04; H04W 16/28; H04W 28/26; H04W 48/16; H04W 56/00;
(Continued)

(56) References Cited

U.S. PATENT DOCUMENTS

| 2012/0300744 | A1  | 11/2012 | Larmo et al. |
| 2014/0307667 | A1  | 10/2014 | Wager et al. |
| 2018/0035332 | A1* | 2/2018  | Agiwal ............... H04J 11/003 |

FOREIGN PATENT DOCUMENTS

| RU | 2556387 C2   | 7/2015 |
| WO | 2011086525 A1 | 7/2011 |

OTHER PUBLICATIONS

International Search Report and Written Opinion dated Apr. 16, 2018 for International Application No. PCT/SE2018/050004 filed on Jan. 4, 2018, consisting of 14-pages.
(Continued)

*Primary Examiner* — Natasha W Cosme
(74) *Attorney, Agent, or Firm* — Christopher & Weisberg, P.A.

(57) ABSTRACT

Methods, a network node and a wireless device for implementing pre-configured grants with a hopping pattern in a wireless communication system are disclosed. According to one aspect, a method in a network node for scheduling uplink transmissions for at least one wireless device is provided. The method includes defining a set of time-frequency uplink distribution patterns utilizing preconfigured grants of time-frequency resources for the at least one wireless device. The method also includes assigning to a first wireless device of the at least one wireless device a first time-frequency uplink distribution pattern from the set.

16 Claims, 7 Drawing Sheets

(52) U.S. Cl.
CPC ......... *H04L 5/0053* (2013.01); *H04W 72/121* (2013.01); *H04W 72/1226* (2013.01); *H04W 72/1268* (2013.01); *H04L 5/001* (2013.01); *H04L 5/0064* (2013.01)

(58) Field of Classification Search
CPC ............. H04W 56/002; H04W 56/003; H04W 72/1268; H04W 72/1284; H04W 76/14; H04W 28/18; H04W 4/40; H04W 4/70; H04W 72/02; H04W 72/04; H04W 72/0413; H04W 72/0446; H04W 72/121; H04W 72/1226; H04W 72/14; H04L 29/08072; H04L 67/10; H04L 67/32; H04L 5/0044; H04L 1/1642; H04L 5/0037; H04L 5/0053; H04L 5/0055; H04L 1/004; H04L 1/0071; H04L 1/1819; H04L 1/1861; H04L 1/1887; H04L 1/1893; H04L 27/2647; H04L 27/2655; H04L 5/001; H04L 5/0016; H04L 5/0023; H04L 5/0048
USPC ........................................................ 370/330
See application file for complete search history.

(56) References Cited

OTHER PUBLICATIONS

3GPP TSG RAN WG1 Meeting #87, R1-1612004; Title: UL URLLC transmission schemes; Source: Intel Corporation; Agenda Item: 7.1.4.4; Document for: Discussion and Decision; Location and Date: Reno, USA Nov. 14-18, 2016, consisting of 7-pages.

3GPP TSG-RAN WG1 Meeting #87, R1-1612252; Title: Grant-free HARQ for URLLC; Source: Nokia, Alcatel-Lucent Shanghai Bell; Agenda Item: 7.1.4.4; Document for: Discussion and Decision; Location and Date: Reno, NV, USA Nov. 14-18, 2016, consisting of 3-pages.

3GPP TSG RAN WG1 Meeting #87, R1-1611689; Title: Grant-free transmission scheme for UL URLLC; Source: Huawei, HiSilicon; Agenda Item: 7.1.4.4; Document for: Discussion and Decision; Location and Date: Reno, Nevada, US Nov. 14-18, 2016, consisting of 9-pages.

* cited by examiner

PRECONFIGURED GRANTS WITH A DISTRIBUTION PATTERN

CROSS-REFERENCE TO RELATED APPLICATIONS

This application is a Submission Under 35 U.S.C. § 371 for U.S. National Stage Patent Application of International Application Number: PCT/SE2018/050004, filed Jan. 4, 2018 entitled "PRECONFIGURED GRANTS WITH A DISTRIBUTION PATTERN," which claims priority to U.S. Provisional Application No. 62/443,358, filed Jan. 6, 2017, entitled "PRECONFIGURED GRANTS WITH A HOPPING PATTERN," the entirety of both of which are incorporated herein by reference.

FIELD

Wireless communications, and in particular, a method, network node, and wireless device for implementing preconfigured grants with a distribution pattern for wireless devices in a communications network for providing contention-based reliable communication.

BACKGROUND

Fifth generation (5G) wireless communication systems are envisaged to expand usage scenarios and applications with respect to current mobile network generations. Ultra-Reliable Low-Latency Communications (URLLC) with strict latency and reliability requirement was agreed as one key scenario for 5G communication systems. URLCC demands an ultra-high delivery reliability of 99.999% (five nines) or even higher within a delivery latency bound as low as half a millisecond. URLLC is relevant for establishing a range of application including:
  Intelligent transportation systems of connected cars;
  Monitoring of smart grids with distributed renewable energy sources;
  Factory automation with communication among actuators, sensors and controllers;
  Drone control and aircraft communication; and
  Remote surgery, remote machine operation, etc.
Each scenario might require a different set of latency and reliability requirements, e.g., 3-5 ms latency with $1$-$10^{-5}$ reliability for smart grids, and 1 ms latency with $1$-$10^{-9}$ reliability for factory automation, etc.

With respect to Long Term Evolution (LTE) uplink (UL) transmissions, a wireless device (WD), such as, for example, a user equipment (UE) waits for the next transmission opportunity to send a scheduling request. Afterwards, a network node, such as, for example, an evolved Node B (eNodeB or eNB) allocates a set of resources to the wireless device. As one part of the URLLC requirements, some standardization work has been done in LTE rel-14 and are on-going for LTE rel-15 to reduce latency down to the sub-millisecond range.

In order to remove the latency due to the waiting time of the scheduling request, UL semi-persistent scheduling (SPS) has been has been standardized since LTE rel-18. IUA pre-allocates the transmission resources to the wireless device in anticipation of possible packet transmissions. In rel-14, SPS was enhanced such that wireless devices do not use the allocated resource to transmit data if the wireless device does not have any packet to transmit. IUA also enhances the WD battery life by avoiding uplink transmissions in case there is nothing to transmit in the WD transmit buffer while avoiding uplink interference.

Another approach to address latency reductions is to reduce the transport time of data and control signaling, by reducing the length of a transmission time interval (TTI), i.e., the smallest scheduling unit. This is called a short transmission time interval (sTTI). In addition, the delivery delay can be reduced, due to a smaller waiting time for sending a scheduling request. Also, SPS enhancements together with sTTI would also enable reducing the latency even further.

Preconfigured grants, including SPS are considered as one component to achieve low latency by pre-assigning uplink resources to the WD. The latency is reduced by skipping the requirement of scheduling requests from the WD to send uplink data. The problem with configured grants is that they consume dedicated uplink resources that are not shared. In most cases even for latency critical scenarios, the WD traffic pattern is sporadic so most dedicated resources are wasted.

SUMMARY

Some embodiments advantageously provide methods, a network node and a wireless device for implementing preconfigured grants with a distribution pattern in a wireless communication system. According to one aspect, a method in a network node for scheduling uplink transmissions for at least one wireless device is provided. The method includes defining a set of time-frequency uplink distribution patterns utilizing preconfigured grants of time-frequency resources of a time-frequency resource pool for the at least one wireless device. The method further includes assigning to a first wireless device of the least one wireless device a first time-frequency uplink distribution pattern from the set.

According to this aspect, in some embodiments, each of a plurality of wireless devices are assigned preconfigured grants of different sizes. In some embodiments, the first wireless device is assigned time-frequency resources on different carriers. In some embodiments, each of the preconfigured grants is utilized in a different shared resource pool in a cyclic manner. In some embodiments, a distribution pattern and size of a resource pool are dynamically reconfigured by a network scheduler of the network node to reduce at least one of frequency selective fading and collisions. In some embodiments, in case of high collisions for Ultra-Reliable Low-Latency Communications (URLLC) traffic, a network scheduler of the network node reverts to dynamic grants of time-frequency resources.

According to another aspect, a network node for scheduling uplink transmissions for at least one wireless device is provided. The network node includes processing circuitry including a memory and a processor, the memory in communication with the processor, the memory having instructions that, when executed by the processor, configure the processor to define a set of time-frequency uplink distribution patterns utilizing preconfigured grants of time-frequency resources of a time-frequency resource pool for the at least one wireless device. The processor is also configured to assign to a first wireless device of the at least one wireless device a first time-frequency uplink distribution pattern from the set.

According to this aspect, in some embodiments, each of a plurality of wireless devices are assigned preconfigured grants of different sizes. In some embodiments, the first wireless device is assigned time-frequency resources on different carriers. In some embodiments, each preconfigured grant is utilized in a different shared resource pool in a cyclic manner. In some embodiments, a distribution pattern and size of a resource pool are dynamically reconfigured by the processor to reduce at least one of frequency selective fading and collisions. In some embodiments, in case of high collisions for Ultra-Reliable Low-Latency Communications (URLLC) traffic, the processor reverts to dynamic grants of time-frequency resources.

According to yet another aspect, in some embodiments, a network node for scheduling uplink transmissions for at least one wireless device is provided. The network node includes a distribution pattern definition module configured to define a set of time-frequency uplink distribution patterns utilizing preconfigured grants of time-frequency resources of a time frequency resource pool for the at least one wireless device. The network node further includes an assigning module configured to assign to a first wireless device of the at least one wireless device a first time-frequency uplink distribution pattern from the set.

According to another aspect, a method in a wireless device for transmitting data packets in an uplink transmission to a network node. The method determining a set of time-frequency uplink distribution patterns utilizing preconfigured grants of time-frequency resources of a time-frequency resource pool for the wireless device. The method also includes transmitting, to the network node, an uplink transmission of the data packets, the uplink transmission based on a determined time-frequency uplink distribution pattern.

According to this aspect, in some embodiments, the determining includes receiving the set of time-frequency uplink distribution patterns from the network node. In some embodiments, each of the preconfigured grants is utilized in a different shared resource pool in a cyclic manner. In some embodiments, a distribution pattern and size of a resource pool are dynamically reconfigured to reduce at least one of frequency selective fading and collisions.

According to yet another aspect, a wireless device for transmitting data packets in an uplink transmission to a network node is provided. The wireless device includes processing circuitry including a memory and a processor, the memory in communication with the processor, the memory having instructions that, when executed by the processor, configure the processor to determine a set of time-frequency uplink distribution patterns utilizing preconfigured grants of time-frequency resources of a time frequency resource pool for the wireless device. The wireless device also includes a transmitter configured to transmit, to the network node, an uplink transmission of the data packets, the uplink transmission based on a determined time-frequency uplink distribution pattern.

According to this aspect, in some embodiments, the determining includes receiving the set of time-frequency uplink distribution patterns from the network node. In some embodiments, each of preconfigured successive grants is utilized in a different shared resource pool in a cyclic manner. In some embodiments, a distribution pattern and size of a resource pool are dynamically reconfigured to reduce at least one of frequency selective fading and collisions.

According to another aspect, a wireless device for transmitting data packets in an uplink transmission to a network node is provided. The wireless device includes a distribution pattern determination module configured to determine a set of time-frequency uplink distribution patterns utilizing preconfigured grants of time-frequency resources for the wireless device. The wireless device also includes a transmitter module configured to transmit, to the network node, an uplink transmission of the data packets, the uplink transmission based on a determined time-frequency uplink distribution pattern.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
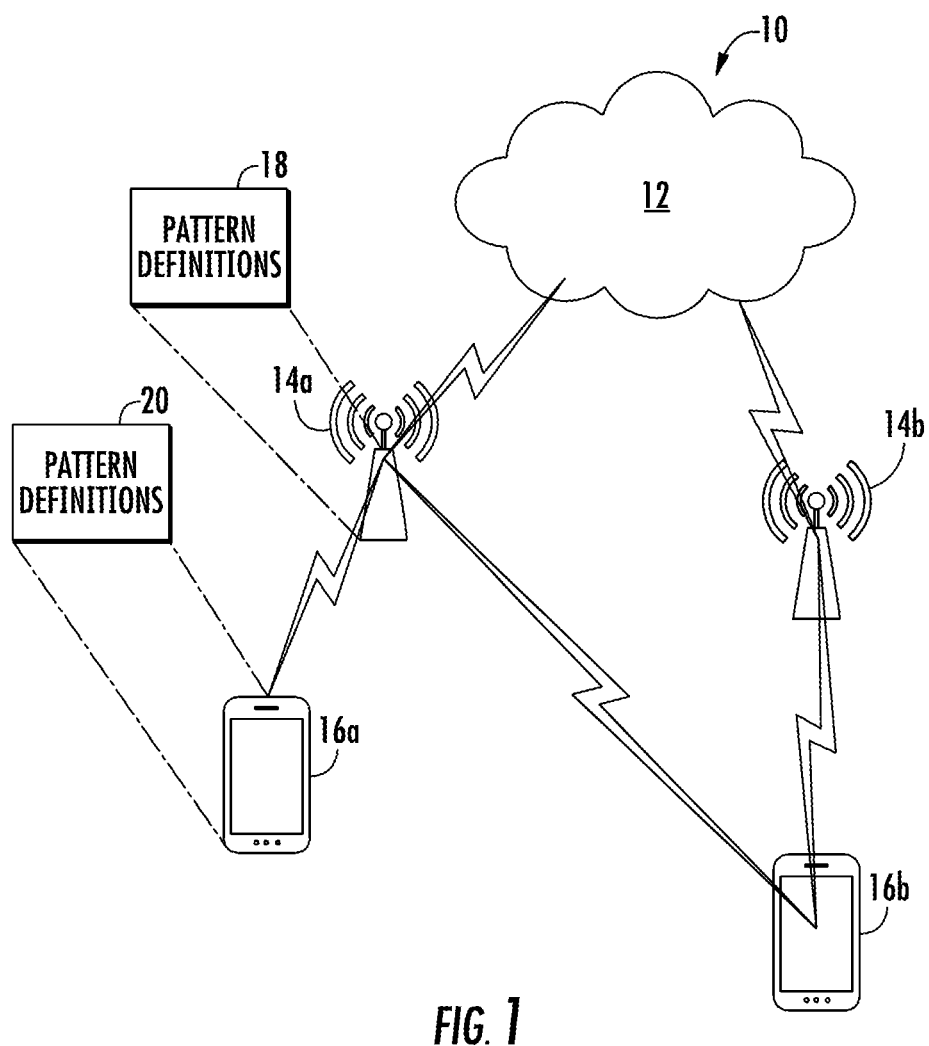
FIG. 1 is a block diagram of a wireless communication system constructed according to principles discussed herein.

Before describing in detail exemplary embodiments, it is noted that the embodiments reside primarily in combinations of apparatus components and processing steps related to implementing pre-configured grants with a distribution pattern for wireless devices. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments provide a resource sharing scheme. The scheme utilizes distribution patterns on top of configured grants using a multiple time-frequency resource pool to distribute wireless device (WD) grants and avoid potential collision of shared resources as well as to avoid frequency selective fading. The terms "hopping" and "distribution" as used herein are interchangeable such that the distribution/hopping of grants may be, for example, a deterministic pattern such as deterministic hopping pattern or a random hopping pattern. One advantage of this arrangement is that configured grants can be shared while meeting latency and reliability requirements. Also, the rotation of preconfigured grant resources between different resource pools in the time-frequency domain makes this arrangement more resilient to successive collisions as well as frequency selective fading.

Candidate communication systems to fulfill such requirements and use-cases are, e.g., Long Term Evolution (LTE) and a newly developed radio access technology called New Radio (NR) by the 3rd Generation Partnership Project (3GPP). It should be understood that the problems and solutions described herein are equally applicable to other access technologies and standards, in particular, new radio (NR), which is a technique that evolved from LTE.

Also note that terminology such as eNodeB and wireless device should be considered non-limiting and does in particular not imply a certain hierarchical relation between the two; in general "eNodeB" could be considered as device 1 and "wireless device" device 2, and these two devices communicate with each other over some radio channel. Also, while the disclosure focuses on wireless transmissions in the downlink, but embodiments are equally applicable in the uplink.

The term wireless device used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles, etc.

The term "network node" used herein may refer to a radio network node or another network node, e.g., a core network node, mobile switching center (MSC), mobile management entity (MME), operation and maintenance (O&M), operation support system (OSS), self-organizing network (SON), positioning node (e.g. evolved serving mobile location center (E-SMLC)), mobile data terminal (MDT) node, etc.

The term "network node" or "radio network node" used herein can be any kind of network node comprised in a radio network which may further comprise any of a base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices at the same location or across a network.

FIG. 1 is a block diagram of a wireless communication system 10 having a cloud network 12, a first network node 14a and a second network node 14b, referred to collectively herein as network nodes 14. Each network node 14 may be connected to other network nodes 14 and in communication with a cloud network 12 such as a backhaul network. Cloud network 12 may include the Internet as well as the public switched telephone system (PSTN) and may include other devices used to provide wireless communication services. Each network node 14 may be in communication with at least one wireless device 16, such as wireless devices 16a and 16b. Each network node 14 may have a function for generating pattern definitions 18 which define time-frequency distribution patterns to assign to the wireless devices (WD) 16. The WDs 16 used these patterns for uplink transmissions to the network nodes 14. Also, in some embodiments, each WD 16 may include a function for including pattern definitions 20 which define time-frequency distribution patterns for uplink communications.

A set of time-frequency resource pools can be defined within the spectrum available for transmission. Each of these resource pools has a unique ID and these resource pools can be preconfigured via broadcast and/or dedicated radio resource control (RRC) signaling. The definition of resource pool may clearly define the start and ending points in terms of time and frequency resources. A set of time-frequency resource pools can be preconfigured in the WD 16. Each pool should have a unique ID. A resource pool, composed of a set of physical resource blocks in time and frequency, does not need to occupy a dedicated and contiguous area in the resource map. In other words, two resource pools can interleave with each other, or even partially overlap.

Configured grants are one of the most efficient ways to allocate resources to the WD 16 for uplink transmission. There are different variants of configured grants including prescheduling, semi-persistent scheduling, and Instant Uplink Access/Fast Uplink Access. The periodicity of the configured grants can be preconfigured during initial configuration of the WD 16 and then the grants can be activated/deactivated at any time using either a medium access control (MAC) command, DCI or RRC. In addition to initial configuration of configured grants with the definition of grant periodicity, one may also pre-configure a set of resource pools as stated above. The WD 16 may also be preconfigured with the starting and ending position of its resource grants within the defined resource pools. The configured grants would then move in cyclic manner between the defined resource pools.

In some embodiments, a set of time-frequency distribution patterns is defined and described for UL transmissions. Each wireless device 16 is assigned a distribution pattern explicitly from the network node 14 using an (Radio Resource Control) RRC protocol. The wireless device 16 uses these physical resources to transmit duplicated or soft-combined packets for the delivery of a single URLLC message, if it has any data to send.

Figure 2:
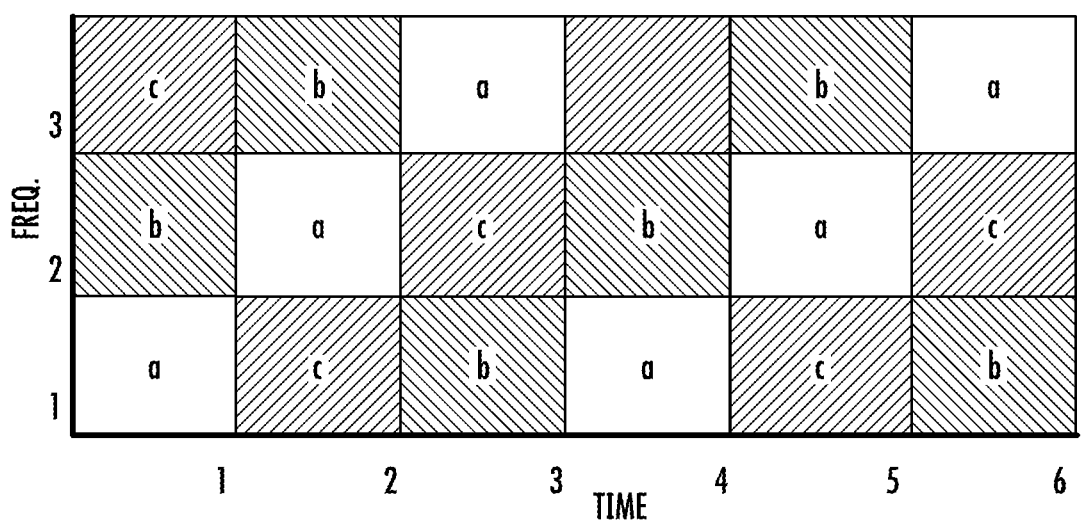
FIG. 2 is an example distribution pattern according to some embodiments provided herein.

Different uplink patterns may be pre-defined. At run time, an uplink transmission distribution pattern may be assigned by the network node 14 to each wireless device, as shown in the example of FIG. 2. In this example, each of the three wireless devices (WD)s (WD-a, WD-b, WD-c) has a repetitive distribution pattern with three consecutive transmissions, which are spread in different times and frequencies. This pattern may be repeated for twice within a total of six TTIs. The WDs transmit duplicate packets or soft-combined packets in the allocated resource blocks, if they have any packets to send. The distribution pattern can also span more than one frequency resource block.

The wireless device 16 may transmit according to the pattern starting from any TTI, according to a configuration, and transmits for a configured number of TTIs. The used frequency resources will either be according to a dynamic pattern, or a fixed time pattern. In one embodiment, a distribution pattern includes N transmissions in consecutive TTIs, or can be composed of more than one frequency resource block in one TTI. Note, that FIG. 2 is but one example of a distribution pattern. Other patterns may readily be determined for one, two or more wireless devices.

Some Embodiments

In some embodiments, the WD 16 is preconfigured with multiple resource pools. Also, the starting and ending location of WD 16 specific resources are defined in the initial configuration of the WD, either explicitly via downlink (DL) signaling, or implicitly to be derived by the WD 16 itself based on a defined rule/formula which takes WD 16 identification (ID) (for example, radio network temporary identifier (RNTI), resume ID, temporary mobile subscriber identity (TMSI), etc.) as input.

In some embodiments, each WD 16 can be configured with different sizes of preconfigured grants in the shared resource pool.

In some embodiments, in case of carrier aggregation and/or dual connectivity, WDs 16 may be configured with resources on different carriers as well, either by multiple resource pools where each is for a dedicated carrier, or an integrated resource pool where the resources are distributed on multiple carriers.

In some embodiments, when preconfigured uplink (UL) access is activated, each successive grant is utilized in a different shared resource pool in a cyclic manner.

In some embodiments, an uplink distribution pattern is predefined in the WD 16 to utilize preconfigured fast uplink grants from the shared resource pool in a distribution pattern. Thus, the WD 16 would utilize successive grants in different time frequency zones, making the WD 16 more resilient to frequency selective fading as well as collision due to high number of WDs 16 in one specific shared resource pool. This would avoid successive collisions if the WD 16 is assigned successive grants within the same resource pool where other WDs 16 are also assigned overlapping resources.

In some embodiments, the distribution pattern and resource pool size should be dynamically reconfigured/adapted by network scheduler to avoid resource pools with frequency selective fading. The network can utilize an uplink reference signal, i.e., sounding reference signals, to detect spectrum regions with high frequency selective fading and configure the WDs 16 with an optimal distribution pattern.

In some embodiments, in case a higher number of collisions are detected in certain resource pools, the distribution pattern, resource pool size and resource pool assignments to WDs 16 should be dynamically reconfigured/adapted by a network scheduler to balance a number of active WDs 16 in each resource pool. The purpose is to reduce the collision rate.

In some embodiments, in case of a high collision rate for URLLC traffic, the scheduler reverts to dynamic grants to meet the reliability conditions.

The reverting can be to release the preconfigured uplink grant of a set of WDs 16 so that they rely on dynamic grants instead;

Or the reverting can be resource specific, e.g., when collision on a specific resource is detected. This detection may be based on high received power or interference. Then, a follow-up contention resolution can be implemented by providing dynamic grants to the WDs 16 which are possibly contending for the resources. The contention may be addressed by dedicated resources for each WD 16 (assuming that the WDs 16 possibly on the contending resource are known by the network and are not too many), or an integrated resource for more than one WD 16. This is similar to MSG3 in a legacy radio access channel (RACH) procedure (assuming that the WDs 16 possibly on the contending resources are either not known by the network or too many).

In some embodiments, the network does not admit more WDs 16 in the shared resource pool if the collision rate starts to affect the latency and reliability critical use cases.

An advantage of the above embodiments is that the preconfigured resources can be shared while meeting the latency requirements. Also, the rotation of preconfigured resources between different resource pools in the time-frequency domain makes the sharing of resources more resilient to successive collisions as well as frequency selective fading. In ultra-reliable and low latency communication (URLLC) use cases, data repetition is used to enhance reliability of receiving packets, but if the repetition ends up on radio resources that are undergoing fading, repetitions could be corrupted. Similarly, if the repetitions happen in the same resource pool with other WDs 16 trying to compete for resources in the same resource pool, repetitions could end up colliding with transmission from other WDs.

The above embodiments help ensure that resource sharing is done with diversity in time-frequency resources so the probability of collision reduces. Also, a fallback solution has been proposed herein so the latency and reliability critical use cases are not affected in case the number of users sharing the resource pool becomes too large and results in high collision rate.

Thus, embodiments include a resource sharing scheme based on configured grants while meeting the requirements of latency and reliability. The method utilizes distribution patterns on top of configured grants using multiple time-frequency resource pools to spread the distribution of WD 16 grants and avoid potential collision of shared resources. This method helps to avoid wasted resources due to configured grants by utilizing them in a shared manner and by utilizing a grant distribution to make sharing of resources resilient to frequency selective fading as well as collision from other WDs 16. Note that in some embodiments the grant distribution pattern may be a random pattern or a hopping pattern.

Figure 3:
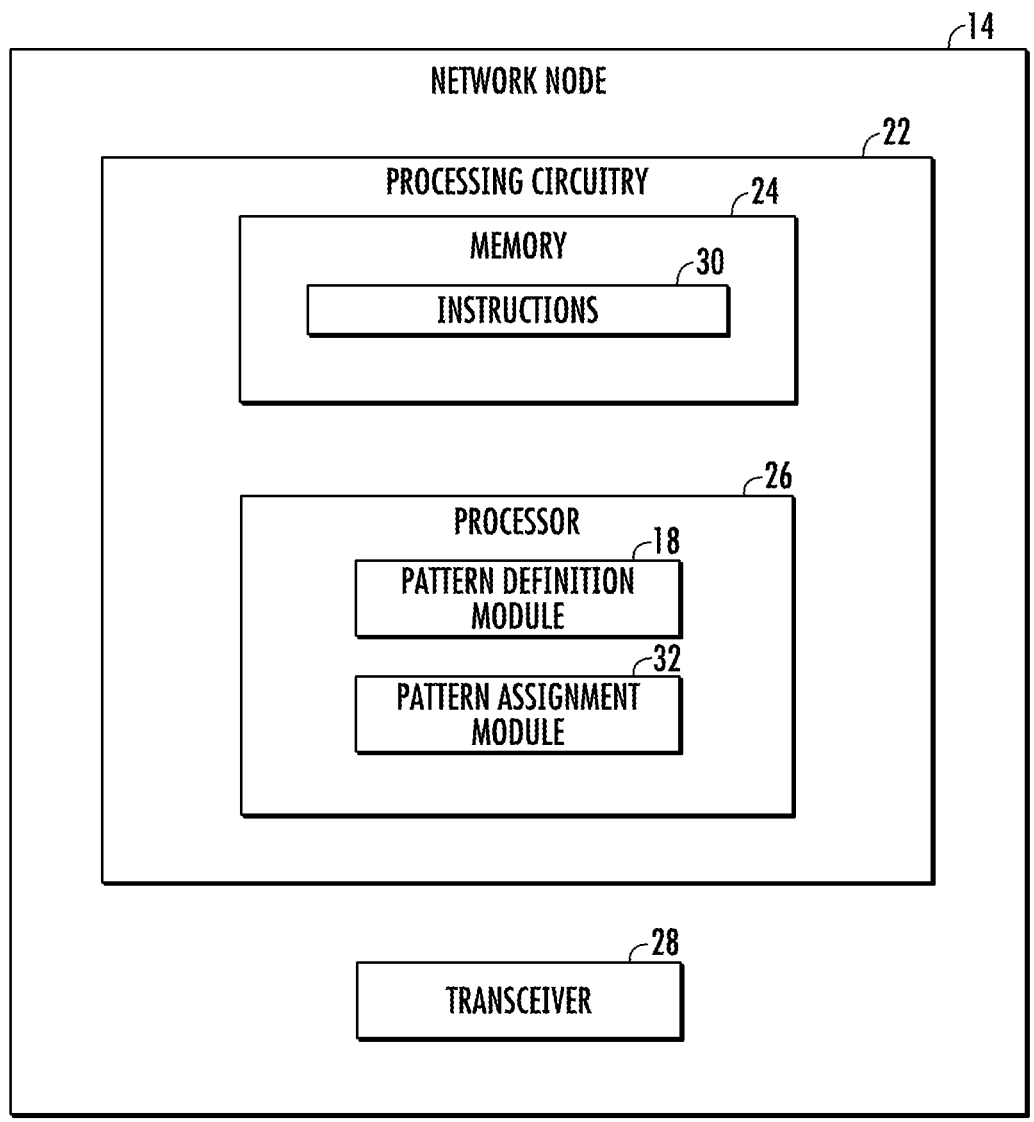
FIG. 3 is a block diagram of a network node configured according to principles provided herein.

FIG. 3 is a block diagram of a network node 14 for scheduling uplink transmissions for at least one wireless device. The network node 14 includes processing circuitry 22 including a memory 24 and a processor 26 as well as a transceiver 28. The memory 24 in communication with the processor 26, the memory 24 having instructions 30 that, when executed by the processor 26, configure the processor 26 to perform functions described herein.

In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry). Processing circuitry 22 may comprise and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The processor 26 implements a pattern definition function 28 configured to define a set of time-frequency uplink distribution patterns utilizing preconfigured grants of time-frequency resources for the at least one wireless device 16. The processor 26 also implements a pattern assignment function 32 configured to assign to a first wireless device 16 a first time-frequency uplink distribution pattern from the set.

Figure 4:
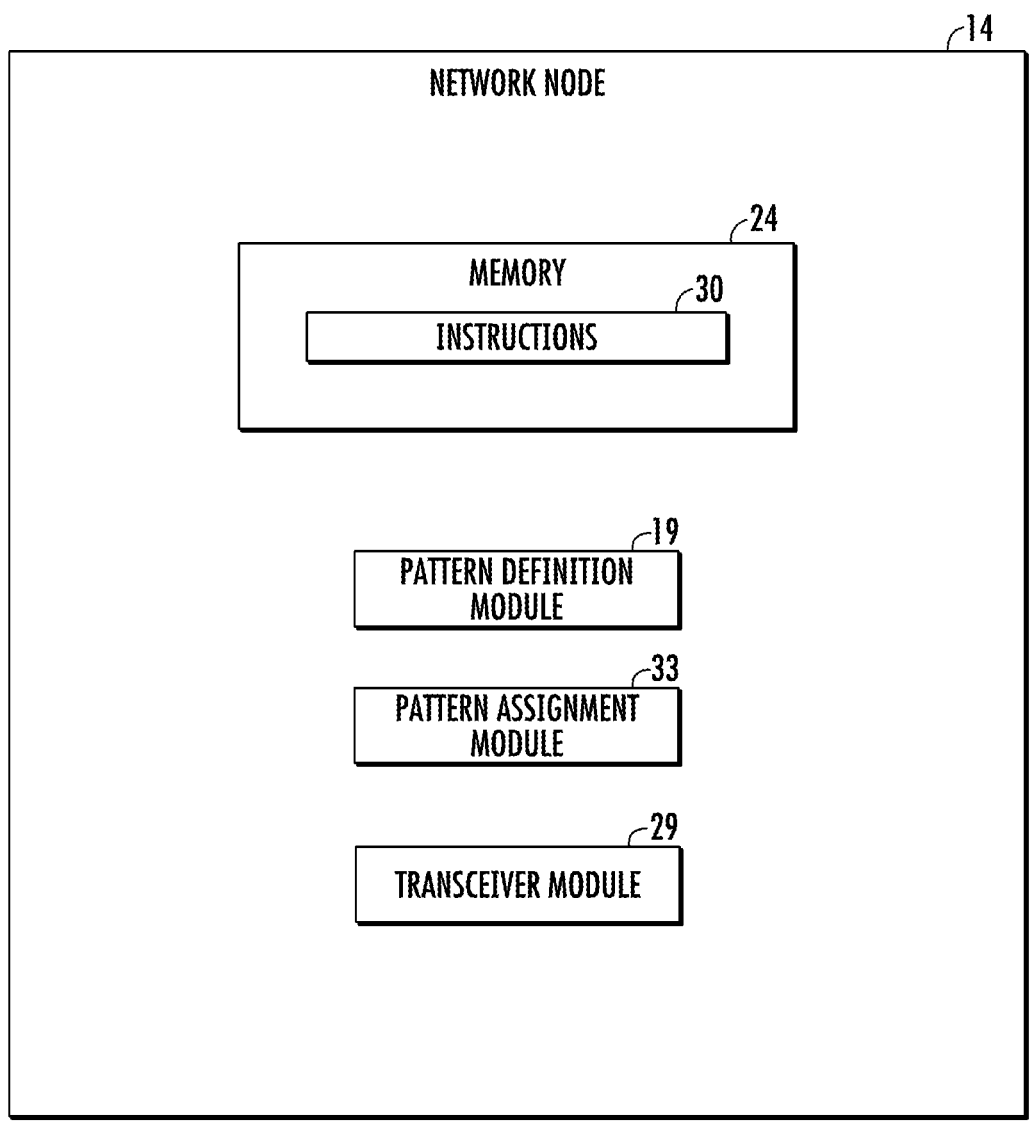
FIG. 4 is a block diagram of an alternative embodiment of a network node configured according to principles discussed herein.

FIG. 4 is a block diagram of an alternative embodiment of the network node 14. The network node 14 may be implemented as software modules that are executable by a processor. The software modules may include a pattern definition module 19 to define the uplink distribution patterns. The software modules may include a pattern assignment module 33 to assign uplink distribution patterns to one or more wireless devices 40. A transceiver module 29 may be implemented in software and hardware and is configured to receive uplink transmissions from WDs 16 and transmit distribution patterns to the WDs 16.

Figure 5:
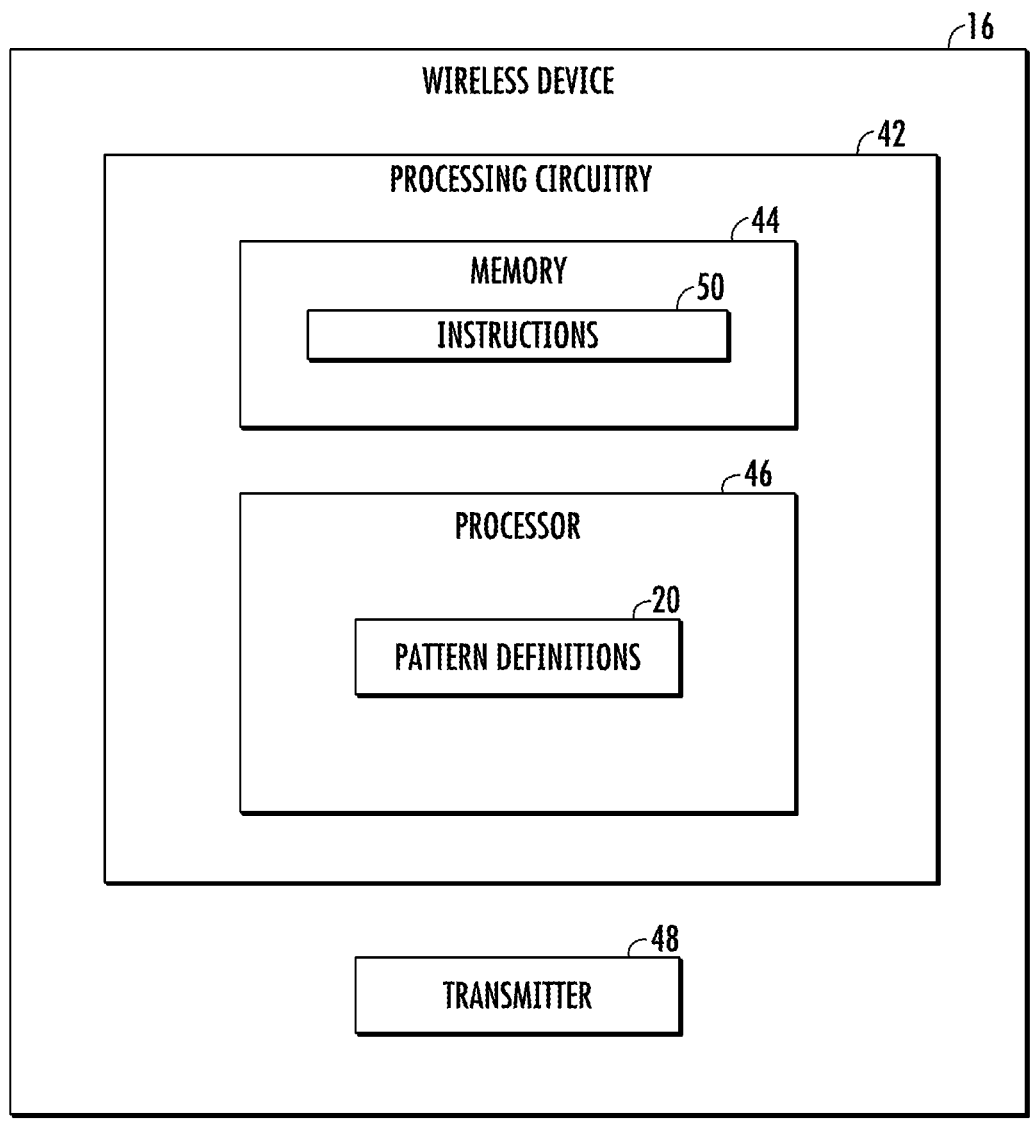
FIG. 5 is a block diagram of a wireless device configured according to principles provided herein.

FIG. 5 is a block diagram of a wireless device 16 for transmitting data packets in an uplink transmission to a network node 14. The wireless device 16 also receives data packets from the network node 14. The wireless device 16 includes processing circuitry 42 including a memory 44 and a processor 46, the memory 44 in communication with the processor 46, the memory 44 having instructions 50 that, when executed by the processor 46, configure the processor 46 to determine a set of time-frequency uplink distribution patterns utilizing preconfigured grants of time-frequency resources for the wireless device 16.

In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry). Processing circuitry 42 may comprise and/or be connected to and/or be configured for accessing (e.g., writing to and/or reading from) memory 44, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The processor 46 implements a pattern definition function 20 configured to determine a set of time-frequency uplink distribution patterns utilizing preconfigured grants of time-frequency resources for the wireless device 16. A transmitter 48 of the wireless device 16 is configured to transmit, to the network node, an uplink transmission of the data packets, the uplink transmission based on the determined time-frequency uplink transmission distribution pattern.

Figure 6:
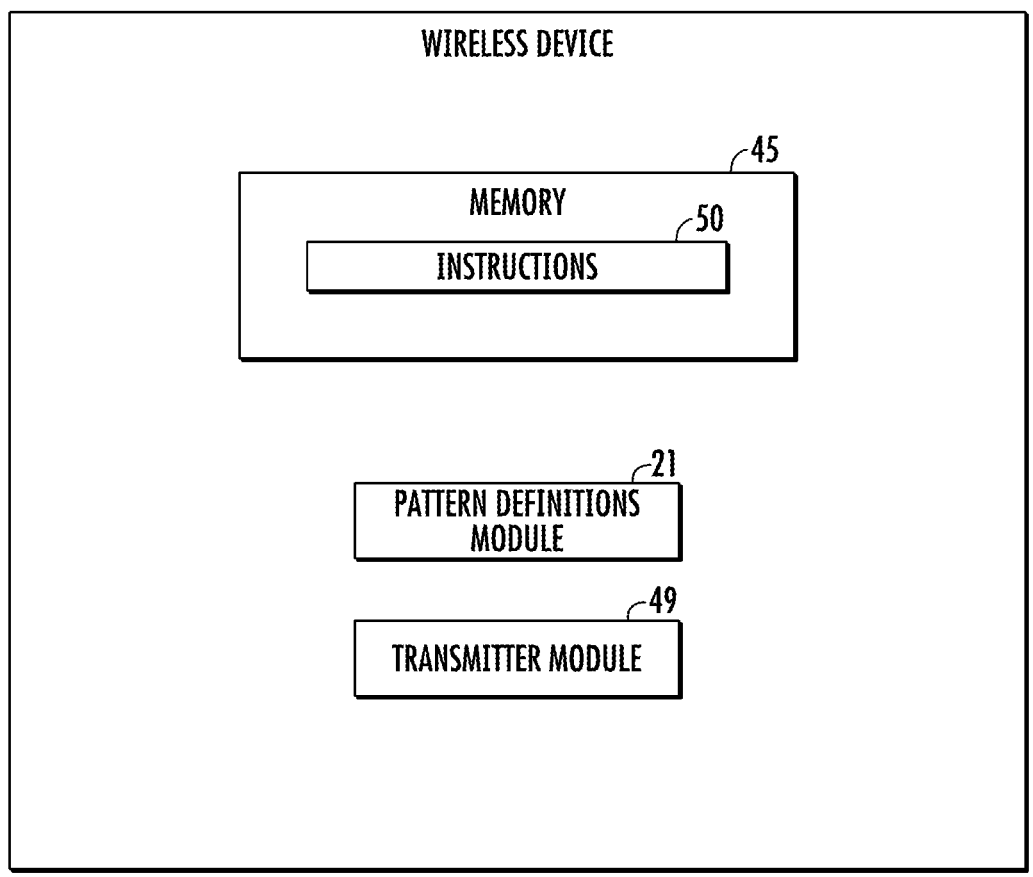
FIG. 6 is a block diagram of an alternative embodiment of a wireless device configured according principles set forth herein.

FIG. 6 is a block diagram of an alternative embodiment of the wireless device 16. The wireless device 16 may be implemented as software modules that are executable by a processor. The software modules may include a pattern definition module 21 to define the uplink distribution patterns. A transmitter module 49 may be implemented in software and hardware and is configured to transmit to the network node, an uplink transmission of the data packets, the uplink transmission based on the determined time-frequency uplink transmission distribution pattern.

Figure 7:
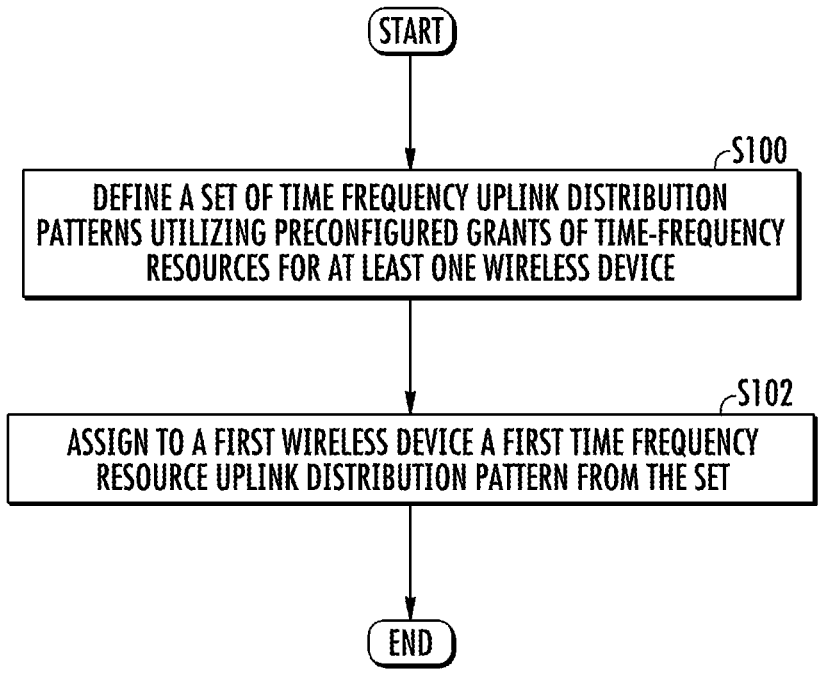
FIG. 7 is a flowchart of an exemplary process performed in a network node for scheduling uplink transmissions for at least one wireless device.

FIG. 7 is a flowchart of an exemplary process performed in a network node 14 for scheduling uplink transmissions for at least one wireless device 16. The process includes defining, via a pattern definitions unit 18, a set of time-frequency uplink distribution patterns utilizing preconfigured grants of time-frequency resources of a time frequency resource pool for the at least one wireless device 16 (block S100). The process also includes assigning, via a pattern assignment unit 32, to a first wireless device 16 a first time-frequency uplink distribution pattern from the set (block S102).

Figure 8:
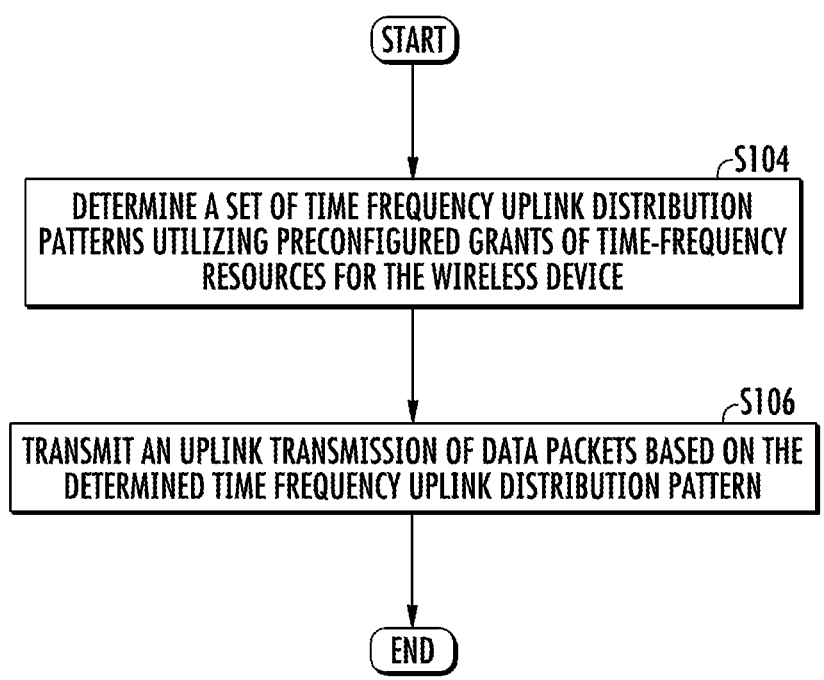
FIG. 8 is a flowchart of an exemplary process performed in a wireless device for transmitting data packets in an uplink transmission to a network node.

FIG. 8 is a flowchart of an exemplary process performed in a wireless device 16 for transmitting data packets in an uplink transmission to a network node 14. The process includes determining, via a pattern definition unit 20, a set of time-frequency uplink distribution patterns utilizing preconfigured grants of time-frequency resources of a time frequency resource pool for the wireless device 16 (block S104). The process also includes transmitting, via the transceiver 48, to the network node 14, an uplink transmission of the data packets, the uplink transmission based on the determined time-frequency uplink distribution pattern (block S106).

Thus, in some embodiments, a method in a network node 14 for scheduling uplink transmissions for at least one wireless device 16 is provided. The method includes defining a set of time-frequency uplink distribution patterns utilizing preconfigured grants of time-frequency resources of a time-frequency resource pool for the at least one wireless device 16, S100. The method further includes assigning to a first wireless device 16 of the least one wireless device 16 a first time-frequency uplink distribution pattern from the set, S102.

According to this aspect, in some embodiments, each of a plurality of wireless devices 16 are assigned preconfigured grants of different sizes. In some embodiments, the first wireless device 16 is assigned time-frequency resources on different carriers. In some embodiments, each of the preconfigured grants is utilized in a different shared resource pool in a cyclic manner. In some embodiments, a distribution pattern and size of a resource pool are dynamically reconfigured by a network scheduler of the network node 14 to reduce at least one of frequency selective fading and collisions. In some embodiments, in case of high collisions for Ultra-Reliable Low-Latency Communications (URLLC) traffic, a network scheduler of the network node 14 reverts to dynamic grants of time-frequency resources.

According to another aspect, a network node 14 for scheduling uplink transmissions for at least one wireless device 16 is provided. The network node 14 includes processing circuitry including a memory 24 and a processor 26, the memory 24 in communication with the processor 26, the memory having instructions that, when executed by the processor 26, configure the processor to define a set of time-frequency uplink distribution patterns utilizing preconfigured grants of time-frequency resources of a time-frequency resource pool for the at least one wireless device 16. The processor 26 is also configured to assign to a first wireless device 16 of the at least one wireless device 16 a first time-frequency uplink distribution pattern from the set.

According to this aspect, in some embodiments, each of a plurality of wireless devices 16 are assigned preconfigured grants of different sizes. In some embodiments, the first is assigned time-frequency resources on different carriers. In some embodiments, each preconfigured grant is utilized in a different shared resource pool in a cyclic manner. In some embodiments, a distribution pattern and size of a resource pool are dynamically reconfigured by the processor 26 to reduce at least one of frequency selective fading and collisions. In some embodiments, in case of high collisions for Ultra-Reliable Low-Latency Communications (URLLC) traffic, the processor reverts to dynamic grants of time-frequency resources.

According to yet another aspect, in some embodiments, a network node 14 for scheduling uplink transmissions for at least one wireless device 16 is provided. The network node 14 includes a distribution pattern definition module 19 configured to define a set of time-frequency uplink distribution patterns utilizing preconfigured grants of time-frequency resources of a time frequency resource pool for the at least one wireless device 16. The network node 14 further includes an assigning module 33 configured to assign to a first wireless device 16 of the at least one wireless device 16 a first time-frequency uplink distribution pattern from the set.

According to another aspect, a method in a wireless device 16 for transmitting data packets in an uplink transmission to a network node 14. The method determining a set of time-frequency uplink distribution patterns utilizing preconfigured grants of time-frequency resources of a time-frequency resource pool for the wireless device 16, S104. The method also includes transmitting, to the network node 14, an uplink transmission of the data packets, the uplink transmission based on a determined time-frequency uplink distribution pattern, S106.

According to this aspect, in some embodiments, the determining includes receiving the set of time-frequency uplink distribution patterns from the network node 14. In some embodiments, each of the preconfigured grants is utilized in a different shared resource pool in a cyclic manner. In some embodiments, a distribution pattern and size of a resource pool are dynamically reconfigured to reduce at least one of frequency selective fading and collisions.

According to yet another aspect, a wireless device 16 for transmitting data packets in an uplink transmission to a network node 14 is provided. The wireless device 16 includes processing circuitry 42 including a memory 44 and a processor 46, the memory 44 in communication with the processor 46, the memory 44 having instructions that, when executed by the processor 46, configure the processor 46 to determine a set of time-frequency uplink distribution patterns utilizing preconfigured grants of time-frequency resources of a time frequency resource pool for the wireless device 16. The wireless device 16 also includes a transmitter 48 configured to transmit, to the network node 14, an uplink transmission of the data packets, the uplink transmission based on a determined time-frequency uplink distribution pattern.

According to this aspect, in some embodiments, the determining includes receiving the set of time-frequency uplink distribution patterns from the network node 14. In some embodiments, each of preconfigured successive grants is utilized in a different shared resource pool in a cyclic manner. In some embodiments, a distribution pattern and size of a resource pool are dynamically reconfigured to reduce at least one of frequency selective fading and collisions.

According to another aspect, a wireless device 16 for transmitting data packets in an uplink transmission to a network node 14 is provided. The wireless device 16 includes a distribution pattern determination module 21 configured to determine a set of time-frequency uplink distribution patterns utilizing preconfigured grants of time-frequency resources for the wireless device 16. The wireless device 16 also includes a transmitter module 49 configured to transmit, to the network node 14, an uplink transmission of the data packets, the uplink transmission based on a determined time-frequency uplink distribution pattern.

Some embodiments include:

Embodiment 1

A method in a network node for scheduling uplink transmissions for at least one wireless device, the method comprising:
defining a set of time-frequency uplink hopping patterns utilizing preconfigured grants of time-frequency resources for the at least one wireless device; and
assigning to a first wireless device of the least one wireless device a first time-frequency uplink hopping pattern from the set.

Embodiment 2

The method of Embodiment 1, wherein each of a plurality of wireless devices are assigned preconfigured grants of different sizes.

Embodiment 3

The method of any of Embodiments 1 and 2, wherein the first wireless device is assigned time-frequency resources on different carriers.

Embodiment 4

The method of any of Embodiments 1-3, wherein, when a fast uplink access is activated, each of the preconfigured successive grants is utilized in a different shared resource pool in a cyclic manner.

Embodiment 5

The method of any Embodiments 1-4, wherein a hopping pattern and size of a resource pool are dynamically reconfigured by a network scheduler of the network node to reduce at least one of frequency selective fading and collisions.

Embodiment 6

The method of any of Embodiments 1-6, wherein, in case of high collisions for Ultra-Reliable Low-Latency Communications (URLLC) traffic, a network scheduler of the network node reverts to dynamic grants of time-frequency resources.

Embodiment 7

A network node for scheduling uplink transmissions for at least one wireless device, the network node comprising:
processing circuitry including a memory and a processor, the memory in communication with the processor, the memory having instructions that, when executed by the processor, configure the processor to:
define a set of time-frequency uplink hopping patterns utilizing preconfigured grants of time-frequency resources for the at least one wireless device; and
assign to a first wireless device of the at least one wireless device a first time-frequency uplink hopping pattern from the set.

Embodiment 8

The network node of Embodiment 7, wherein each of a plurality of wireless devices are assigned preconfigured grants of different sizes.

Embodiment 9

The network node of any of Embodiments 7-8, wherein the first wireless device is assigned time-frequency resources on different carriers.

Embodiment 10

The network node of any of Embodiments 7-9, wherein, when a preconfigured uplink access scheme is activated, each preconfigured successive grant is utilized in a different shared resource pool in a cyclic manner.

Embodiment 11

The network node of any of Embodiments 7-10, wherein a hopping pattern and size of a resource pool are dynamically reconfigured by the processor to reduce at least one of frequency selective fading and collisions.

Embodiment 12

The network node of any of Embodiments 7-11, wherein, in case of high collisions for Ultra-Reliable Low-Latency Communications (URLLC) traffic, the processor reverts to dynamic grants of time-frequency resources.

Embodiment 13

A network node for scheduling uplink transmissions for at least one wireless device, the network node comprising:
a hopping pattern definition module configured to define a set of time-frequency uplink hopping patterns utilizing preconfigured grants of time-frequency resources for the at least one wireless device; and
an assigning module configured to assign to a first wireless device of the at least one wireless device a first time-frequency uplink hopping pattern from the set.

Embodiment 14

A method in a wireless device for transmitting data packets in an uplink transmission to a network node, the method comprising:

determining a set of time-frequency uplink hopping patterns utilizing preconfigured grants of time-frequency resources for the wireless device; and
transmitting, to the network node, an uplink transmission of the data packets, the uplink transmission based on the determined time-frequency uplink transmission hopping pattern.

Embodiment 15

The method of Embodiment 14, wherein the determining includes receiving the set of time-frequency uplink hopping patterns from the network node.

Embodiment 16

The method of any of Embodiments 14 and 15, wherein, when a preconfigured uplink access is activated, each of preconfigured successive grants is utilized in a different shared resource pool in a cyclic manner.

Embodiment 17

The method of any of Embodiments 14-16, wherein a hopping pattern and size of a resource pool are dynamically reconfigured to reduce at least one of frequency selective fading and collisions.

Embodiment 18

A wireless device for transmitting data packets in an uplink transmission to a network node, the wireless device comprising:
processing circuitry including a memory and a processor, the memory in communication with the processor, the memory having instructions that, when executed by the processor, configure the processor to determine a set of time-frequency uplink hopping patterns utilizing preconfigured grants of time-frequency resources for the wireless device; and
a transmitter configured to transmit, to the network node, an uplink transmission of the data packets, the uplink transmission based on the determined time-frequency uplink transmission hopping pattern.

Embodiment 19

The wireless device of Embodiment 18, wherein the determining includes receiving the set of time-frequency uplink hopping patterns from the network node.

Embodiment 20

The wireless device of any of Embodiments 18 and 19, wherein, when a preconfigured uplink access is activated, each of preconfigured successive grants is utilized in a different shared resource pool in a cyclic manner.

Embodiment 21

The wireless device of any of Embodiments 18-20, wherein a hopping pattern and size of a resource pool are dynamically reconfigured to reduce at least one of frequency selective fading and collisions.

Embodiment 22

A wireless device for transmitting data packets in an uplink transmission to a network node, the wireless device comprising:

a hopping pattern determination module configured to determine a set of time-frequency uplink hopping patterns utilizing preconfigured grants of time-frequency resources for the wireless device; and a transmitter module configured to transmit, to the network node, an uplink transmission of the data packets, the uplink transmission based on the determined time-frequency uplink transmission hopping pattern.

| Abbreviation | Explanation |
|---|---|
| 3GPP | 3rd Generation Partnership Project |
| 5G | fifth Generation |
| DL | Downlink |
| eNB | eNodeB |
| Fast UL | Fast Uplink/Instant Uplink Access |
| HARQ | Hybrid Automatic Repeat Request |
| LTE | Long Term Evolution |
| NR | New Radio |
| sTTI | Short TTI |
| TTI | Transmission Time Interval |
| UE | User Equipment |
| UL | Uplink |
| URLLC | Ultra-reliable and low latency communication |
| WD | Wireless Device |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for scheduling uplink transmissions for at least one wireless device, the method comprising:

defining a set of time-frequency uplink distribution patterns utilizing preconfigured grants of time-frequency resources of a time-frequency resource pool for the at least one wireless device, each of the preconfigured grants being utilized in a different shared resource pool in a cyclic manner;

assigning to a first wireless device of the least one wireless device a first time-frequency uplink distribution pattern from the set; and reverting to dynamic grants of time-frequency resources when collisions exceed a threshold for Ultra-Reliable Low-Latency Communications, URLLC, traffic, the reverting being performed by a network scheduler of the network node.

2. The method of claim 1, wherein each of a plurality of wireless devices are assigned preconfigured grants of different sizes.

3. The method of claim 1, wherein the first wireless device is assigned time-frequency resources on different carriers.

4. The method of claim 1, wherein a distribution pattern and size of a resource pool are dynamically reconfigured by a network scheduler of the network node to reduce at least one of frequency selective fading and collisions.

5. A network node for scheduling uplink transmissions for at least one wireless device, the network node comprising:
processing circuitry including a memory and a processor, the memory in communication with the processor, the memory having instructions that, when executed by the processor, configure the processor to:
define a set of time-frequency uplink distribution patterns utilizing preconfigured grants of time-frequency resources of a time-frequency resource pool for the at least one wireless device, each preconfigured grant being utilized in a different shared resource pool in a cyclic manner; and
assign to a first wireless device of the at least one wireless device a first time-frequency uplink distribution pattern from the set; and
revert to dynamic grants of time-frequency resources when collisions exceed a threshold for Ultra-Reliable Low-Latency Communications, URLLC, traffic.

6. The network node of claim 5, wherein each of a plurality of wireless devices are assigned preconfigured grants of different sizes.

7. The network node of claim 5, wherein the first wireless device is assigned time-frequency resources on different carriers.

8. The network node of claim 5, wherein a distribution pattern and size of a resource pool are dynamically reconfigured by the processor to reduce at least one of frequency selective fading and collisions.

9. A network node for scheduling uplink transmissions for at least one wireless device, the network node comprising:
a distribution pattern definition module configured to define a set of time-frequency uplink distribution patterns utilizing preconfigured grants of time-frequency resources of a time frequency resource pool for the at least one wireless device, each preconfigured grant being utilized in a different shared resource pool in a cyclic manner; and
an assigning module configured to assign to a first wireless device of the at least one wireless device a first time-frequency uplink distribution pattern from the set, the assigning module further configured to revert to dynamic grants of time-frequency resources when collisions exceed a threshold for Ultra-Reliable Low-Latency Communications, URLLC, traffic.

10. A method in a wireless device for transmitting data packets in an uplink transmission to a network node, the method comprising:
determining a set of time-frequency uplink distribution patterns utilizing preconfigured grants of time-frequency resources of a time-frequency resource pool for the wireless device, each preconfigured grant being utilized in a different shared resource pool in a cyclic manner;
reverting to requesting dynamic grants of time-frequency resources when collisions exceed a threshold for Ultra-Reliable Low-Latency Communications, URLLC, traffic; and
transmitting, to the network node, an uplink transmission of the data packets, the uplink transmission based on one of a determined time-frequency uplink distribution pattern and a dynamic grant.

11. The method of claim 10, wherein the determining includes receiving the set of time-frequency uplink distribution patterns from the network node.

12. The method of claim 10, wherein a distribution pattern and size of a resource pool are dynamically reconfigured to reduce at least one of frequency selective fading and collisions.

13. A wireless device for transmitting data packets in an uplink transmission to a network node, the wireless device comprising:
processing circuitry including a memory and a processor, the memory in communication with the processor, the memory having instructions that, when executed by the processor, configure the processor to:
determine a set of time-frequency uplink distribution patterns utilizing preconfigured grants of time-frequency resources of a time frequency resource pool for the wireless device, each preconfigured grant being utilized in a different shared resource pool in a cyclic manner; and
revert to requesting dynamic grants of time-frequency resources when collisions exceed a threshold for Ultra-Reliable Low-Latency Communications, URLLC, traffic; and
a transmitter configured to transmit, to the network node, an uplink transmission of the data packets, the uplink transmission based on one of a determined time-frequency uplink distribution pattern and a dynamic grant.

14. The wireless device of claim 13, wherein the determining includes receiving the set of time-frequency uplink distribution patterns from the network node.

15. The wireless device of claim 13, wherein a distribution pattern and size of a resource pool are dynamically reconfigured to reduce at least one of frequency selective fading and collisions.

16. A wireless device for transmitting data packets in an uplink transmission to a network node, the wireless device comprising:
a distribution pattern determination module configured to:
determine a set of time-frequency uplink distribution patterns utilizing preconfigured grants of time-frequency resources for the wireless device, each preconfigured grant being utilized in a different shared resource pool in a cyclic manner; and
revert to requesting dynamic grants of time-frequency resources when collisions exceed a threshold for Ultra-Reliable Low-Latency Communications, URLLC, traffic; and
a transmitter module configured to transmit, to the network node, an uplink transmission of the data packets, the uplink transmission based on one of a determined time-frequency uplink distribution pattern and a dynamic grant.

* * * * *